US006829009B2

(12) United States Patent
Sugimoto (10) Patent No.: US 6,829,009 B2
(45) Date of Patent: Dec. 7, 2004

(54) ELECTRONIC CAMERA (75) Inventor: Masahiko Sugimoto, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/947,449

(22) Filed: Sep. 7, 2001

(65) Prior Publication Data
US 2002/0030754 A1 Mar. 14, 2002

(30) Foreign Application Priority Data
Sep. 8, 2000 (JP) .......................................... 2000-273518

(51) Int. Cl.[7] .......................... H04N 5/222; H04N 5/76; G09G 5/00
(52) U.S. Cl. ............................ 348/333.02; 348/333.05; 348/231.06; 345/789; 345/811; 345/700
(58) Field of Search ............................. 348/207, 333.02, 348/333.05, 333.01, 231.2–231.6; 345/811, 146, 700, 779, 783, 788, 789, 820; 395/159

(56) References Cited

U.S. PATENT DOCUMENTS

| 5,396,264 A | * | 3/1995 | Falcone et al. ............. 345/146 |
| 5,497,455 A | * | 3/1996 | Suga et al. .................. 395/159 |
| 6,310,648 B1 | * | 10/2001 | Miller et al. ............ 348/333.05 |
| 6,563,542 B1 | * | 5/2003 | Hatakenaka et al. ... 348/333.02 |
| 6,636,264 B1 | | 10/2003 | Nakao et al. |
| 2001/0030695 A1 | * | 10/2001 | Prabhu et al. ......... 348/333.01 |
| 2002/0054233 A1 | * | 5/2002 | Juen ....................... 348/333.05 |

FOREIGN PATENT DOCUMENTS

| JP | 09-104151 A | | 4/1997 | |
| JP | 11-261852 | * | 9/1999 | .......... H04N/5/225 |
| JP | 11-331662 A | | 11/1999 | |

* cited by examiner

Primary Examiner—Andrew Christensen
(74) Attorney, Agent, or Firm—Birch, Stewart, Kolasch & Birch, LLP.

(57) ABSTRACT

The electronic camera can realize menu functions that make it easier for a user to select each function and change various set items in accordance with how the user uses the camera. When a menu/execution button is pressed in a manual capturing mode, control goes to a capturing setting menu screen. The capturing setting menu is composed of a plurality of menu items such as white balance, ISO sensitivity, brightness (exposure correction), quality, etc. The menu items are automatically disposed in descending frequency order or in a display order specified by the user freely. It is also possible to set a starting position of a cursor at the item used most frequently on an initial menu screen while a display order of the menu items is kept unchanged. The display order of the menu items may also be fixed to that set in the initial state at the shipping time.

13 Claims, 10 Drawing Sheets

ELECTRONIC CAMERA

BACKGROUND OF THE INVENTION

1. Field of the Invention

The present invention relates to an electronic camera, more particularly to a menu displaying technique of an electronic camera that employs Graphical User Interface (GUI) enabled to enter various set items such as capturing conditions, etc. on a menu screen.

2. Description of the Related Art

Japanese Patent Application Publication No. 11-261852 discloses an electronic camera provided with menu-related functions. According to the disclosed electronic camera, it is possible to set various capturing conditions such as exposure correction, light measuring method, whether to enable consecutive capturing, white balance setting, display language, etc. for capturing menu items. The capturing menu items are displayed on a liquid crystal display (LCD) monitor built in the camera. The user makes a predetermined operation on an operation block so as to move the cursor onto a target menu item and select the menu.

The menu screen of each conventional electronic camera, however, displays menu items in a predetermined (fixed) order. However, the camera is usually used in the user's own way, which is often different from those of other users. This is why functions and set items might come to differ among users. None of the conventional cameras have coped with such the diversified tastes of users; the menu screen is displayed fixedly, so that the controllability of the camera, such as selecting of functions and changing of set items has not been easy so much.

SUMMARY OF THE INVENTION

Under such circumstances, it is an object of the present invention to provide an electronic camera that can realize menu related functions enabled to select functions and change set contents easily in accordance with the taste of the user.

In order to attain the above object, the present invention is directed to an electronic camera, comprising: a capturing device which converts a subject optical image to an electric signal; a recording device which records the image captured by the capturing device on a recording medium; a displaying device which displays a plurality of menu items for setting a capturing condition; a display order deciding device which decides an order for displaying the menu items; a menu display changing device which disposes menu items in accordance with the display order decided by the display order deciding device so as to change the display order of the menu items; and an operating device through which a command is entered for selecting a desired menu item among a plurality of the menu items.

According to the present invention, therefore, each user can operate the electronic camera easily, since the display order of the menu items can be changed on the GUI screen.

Preferably, the electronic camera further comprises a display order setting device which enables the user to set a display order of the menu items freely, wherein the display order deciding device decides the order for displaying the menu items in accordance with contents set with the display order setting device.

Preferably, the electronic camera further comprises a frequency counting device which counts a frequency of changes of each menu item set contents, wherein the display order deciding device decides the order for displaying the menu items in accordance with descending frequency order found by the frequency counting device.

The display order of the menu items may be switched between a free mode that enables the user to set a display order of the menu items and a descending frequency order mode that changes the display order automatically in descending frequency order. It is also possible to store predetermined display orders including the initial state at the shipping time beforehand, thereby the menu display order can be switched to a predetermined one in accordance with the user's operation.

In another embodiment of the present invention, an electronic camera comprises: a capturing device which converts a subject optical image to an electric signal; a recording device which records the image captured by the capturing device on a recording medium; a displaying device which displays a plurality of menu items used to set a capturing condition; an operating device through which a command is entered for selecting a desired menu item among a plurality of the menu items by moving a cursor onto the desired menu item; a frequency counting device which counts a frequency of changes of each menu item set content; a starting position deciding device which decides a menu item changed most frequently as a starting position of the cursor according to a result of counting by the frequency counting device on a menu screen; and a starting position changing device which changes the starting position of the cursor for a menu display order in accordance with a decision of the starting position deciding device.

The ease of the camera operation is improved in case where it is enabled to set the starting position of the cursor (selection mark) automatically to the menu item of which setting is changed most frequently even while the display order of the menu items is kept unchanged.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder, the preferred embodiments of the present invention for an electronic camera will be described with the accompanying drawings.

Figure 1:
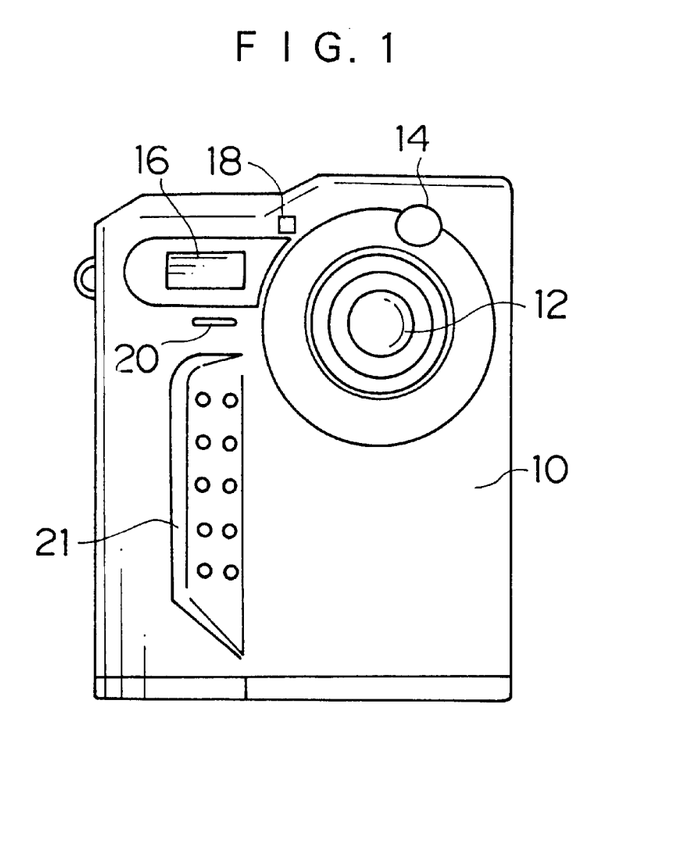
FIG. 1 is a front view of a digital camera according to an embodiment of the present invention.

FIG. 1 shows a front view of a digital camera according to an embodiment of the present invention. The digital camera (hereinafter, to be abbreviated as the camera) 10 is provided with a taking lens 12; a viewfinder 14; an electric flash 16; an electric flash sensor 18; and a self-timer lamp 20. A CCD image sensor 56 (see FIG. 4) is disposed at a rear side of the taking lens 12. The CCD image sensor 56 is used as an imaging device. The camera 10 has a grip portion 21. Although not shown in FIGS. 1 and 4, a card slot for a memory card 76, a digital I/O terminal, a video output terminal, and a DC power supply terminal are disposed at a side surface of the camera 10, which is at the opposite side of the grip portion 21.

Figure 2:
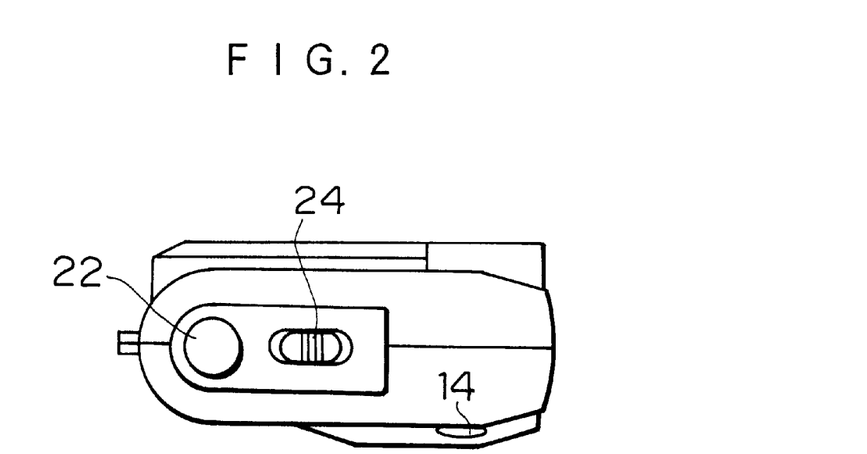
FIG. 2 is a top view of the digital camera shown in FIG. 1.

As shown in FIG. 2, on the top of the camera 10 are disposed a shutter release button 22 and a power switch 24. The shutter release button 22 is pressed in two steps; when the shutter release button 22 is pressed by a half (half-down), the automatic focusing (AF) and the automatic exposure controlling (AE) are started, thereby both AF and AE are locked. When the shutter release button 22 is pressed fully (full-down) in the half-on state, the subject picture is taken. The shutter release button 22 is also used as a record button for directing start/stop of recording a movie.

Figure 3:
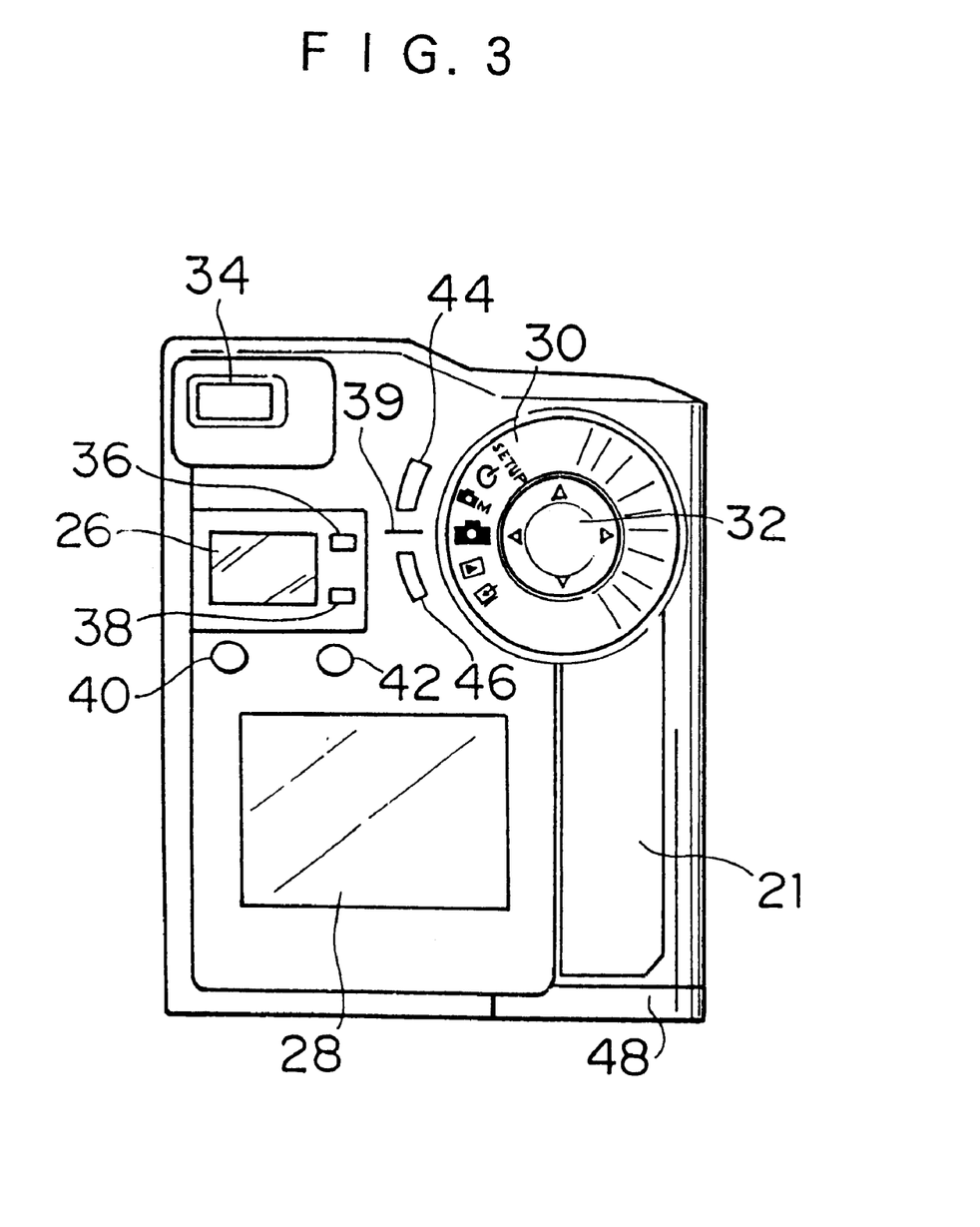
FIG. 3 is a rear view of the digital camera shown in FIG. 1.

FIG. 3 shows a rear view of the camera 10. At the rear side of the camera 10 are disposed an LCD panel 26 used to display characters; an LCD monitor 28; a mode dial 30; a cross button 32; a viewfinder 34, etc. The LCD panel 26 displays information related to a state of the camera 10, a capturing mode, etc. as characters, simple patterns, etc. For example, the panel 26 displays such information as a battery check result; the number of exposable frames; read-out frame numbers; whether to emit the electric flash; a macro mode; recording quality; the number of pixels, etc.

At a side of the LCD panel 26 are disposed an electric flash button 36 used to select a mode for capturing in the electric flash and a macro button 38 used to set/reset the short distance (macro) capturing mode.

The LCD monitor 28 can be used as an electronic finder for checking the angle of view at the capturing time to display a preview screen for captured images, images to read out, etc. read from the memory card 76. The LCD monitor 28 is also used to select a menu with use of the cross button 32 and display various set items of each menu.

The mode dial 30 is used to switch among the functions of the camera 10. The mode dial 30 is turned so that the target mode mark is positioned on the index 39 drawn on the dial 30, thereby the user can select any of the setup mode, the self-timer capturing mode, the manual capturing mode, the normal capturing mode, the read-out mode, the PC mode, etc.

The cross button 32 is pressed at an edge portion (upper, lower, right, and left) thereof so as to enter a command for selecting corresponding one of the four directions (upper, lower, right, and left). The button 32 is also used to select one of various setting items and direct a change of a set item on the menu screen, as well as to adjust the magnification of the electronic zoom, move the center of the zoom, and feed read-out frames forward/back.

A shift button 40 and a display button 42 are provided. The shift button 40 is a push switch used to extend each of the functions of the cross button 32 and other key switches. The display button 42 is used to turn on/off the LCD monitor 28 and the display of the image frame number during a read-out operation, etc.

A cancel/return button 44 is disposed at the upper side and a menu/execute button 46 is disposed at the lower side with an index 39 of the mode dial 30 therebetween. The cancel/return button 44 is used to cancel a selected menu and go back into the previous operation state. The menu/execute button 46 is used, for example, to shift a normal screen in each mode to the menu screen or decide a selected item and direct execution (confirmation) of the selected item.

At the bottom of the camera 10 is disposed a battery cover 48, which can be closed/opened freely. A battery (not shown) is set vertically here along the grip portion 21.

Figure 4:
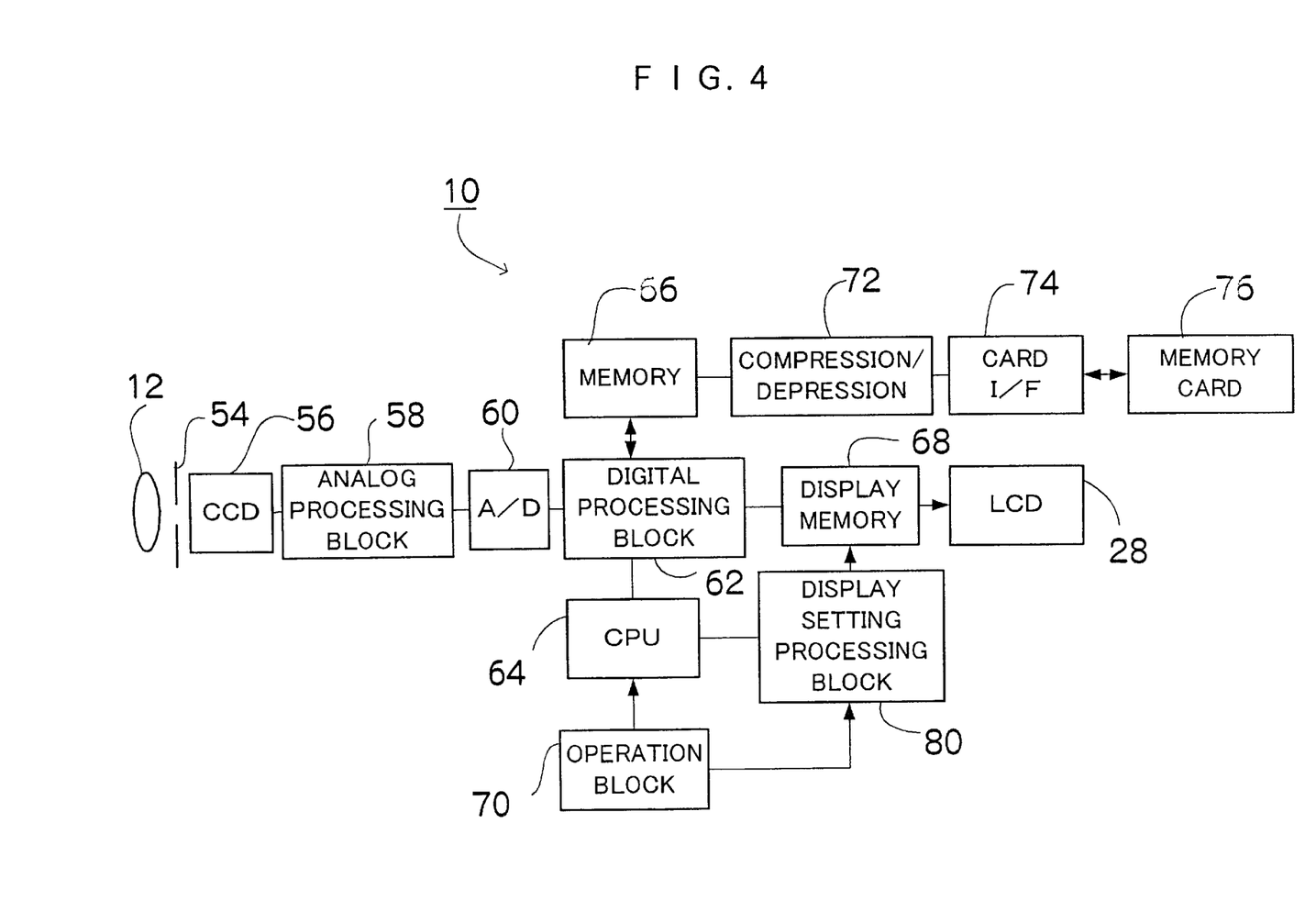
FIG. 4 is a block diagram of the digital camera according to this example.

FIG. 4 shows an internal block diagram of the camera 10. The taking lens 12 is composed of one or a plurality of lenses. The lens 12 may be a single focal one or a zoom one which is variable in focal length. A light passing the lens 12 is adjusted in light volume by a diaphragm 54, then entered to a charge-coupled device image sensor (hereinafter, to be referred to as the CCD) 56. On the light receiving surface of the CCD 56 are disposed a plurality of photo sensors in one plane. A subject image focused on the light receiving surface of the CCD 56 is converted to a signal charge by each photo sensor in accordance with the entered light volume. The CCD 56 has a so-called electronic shutter function used to control the charging time (shutter speed) of each photo sensor in accordance with the shutter gate pulse timing.

The signal charges accumulated such way are read sequentially as a voltage signal (image signal) corresponding to each signal charge according to the pulse given from the CCD driver (not shown). The image signal output from the CCD 56 is sent to an analog-processing block 58. The analog processing block 58 includes such signal processing circuits as a sampling hold circuit, a color separating circuit, a gain adjusting circuit, etc. A correlative double sampling processing (CDS), a color separation into R, G, and B color signals, and each color signal level adjustment (pre-white balance processing) are executed in this analog-processing block 58.

The signals output from the analog processing block 58 are converted to digital signals by an A/D converter 60, then entered to a digital processing block 62. The digital processing block 62 is an image processing device including a brightness/color difference signal generation circuit, a gamma corrective circuit, a sharpness corrective circuit, a contrast corrective circuit, a white balance corrective circuit, etc. The digital-processing block 62 processes image signals according to the commands from the CPU 64.

Each image data item entered to the digital processing block 62 is converted to a brightness signal (Y signal) and color difference signals (Cr and Cb signals), then such predetermined processings as gamma correction, etc. are applied to those signals, which are then stored in a memory 66. When a captured image is to be displayed/output, the image data is read from the memory 66 and transferred to the display memory 68 via the digital-processing block 62. The data stored in the display memory 68 is converted to video signals in such a predetermined format as the NTSC method, etc. and output onto the LCD monitor 28.

The image data in the memory 66 is rewritten periodically by the image signals output from the CCD 56. Video signals generated from the image data are then supplied to the LCD monitor 28, thereby images entered via the CCD 56 are displayed on the LCD monitor 28 in real time. The user can thus check a captured field angle with an image displayed on the LCD monitor 28 or through the optical viewfinder 34.

When the capturing mode is set by the mode dial 30 provided in the operation block 70 and the shutter release button 22 is pressed, a release ON signal is issued so as to start capturing. The CPU 64 detects the release ON signal and executes capturing for recording. Concretely, the CPU 64 controls a lens driver including a motor not shown, thereby focusing on a subject. The CPU 64 also controls the diameter of the orifice of the diaphragm 54 and the electronic shutter of the CCD 56, thereby controlling exposure.

When the user presses the shutter release button 22, image data is fetched and recorded. When a mode for compressing and recording image data is selected, the CPU 64 sends a command to a compression/depression circuit 72. Consequently, the compression/depression circuit 72 compresses the image data in the memory 66 in such a predetermined format as JPEG, etc.

Compressed image data is recorded in a memory card 76 via a card interface 74. When a mode for recording non-compressed image data (non-compression mode) is selected, the compression/depression circuit 72 does not compress the data. The image data is thus recorded as is in the memory card 76.

The camera 10 in this embodiment uses, for example, a "smart media" (solid-state floppy disk card) as an image data storing device. The recording medium is not limited only to that, however; it may be a PC card, a compact flash memory, a magnetic disk, an optical disk, an optical magnetic disk, a memory stick, etc. Concretely, there are many more media into/from which data can be written/read electronically, magnetically, optically, or by combining those methods. The camera 10 can employ a signal processing device and an interface in accordance with the medium to be used. The camera 10 may also be configured so as to use a plurality of media whether they are different or identical in type. The means for storing image files is not limited only to removable media; it may be a recording medium (internal memory) built in the camera 10.

When the read-out mode is set by the mode dial 30, an image file is read from the memory card 76. The read image data is depressed by the compression/depression circuit 72 as needed, then output onto the LCD monitor 28 via the display memory 68.

The CPU 64 is a general controller for controlling each circuit of the camera 10. According to the input signals received from the operation block 70, the CPU 64 controls the operation of the corresponding circuit, as well as the display on the LCD monitor 28, the emission of the electric flash, the auto focusing (AF), and the auto exposure (AE), etc.

The operation block 70 includes the power switch 24; the shutter release button 22; the mode dial 30; the cross button 32; the menu/execution button 46; and other command-input device. The operation block 70 which is not limited to a configuration such as a push-button switch, a dial, a lever-type switch, and a slide-type knob may be configured so as to select any one of the menu items displayed on the LCD monitor 28 and the choices with use of the cursor, the pointer, the touch panel, etc.

The digital camera 10 in this embodiment is provided with a display setting processing block 80 used to process set items for each display mode on the menu screen. This processing block 80 can thus change the display order of menu items. The display order of the menu items will be described later more in detail. The CPU 64 updates the display order of the menu items automatically by controlling the display setting processing block 80 with use of a program. The CPU 64 can also change the display order of the menu items on the screen according to a command from the operation block 70.

Figure 5:
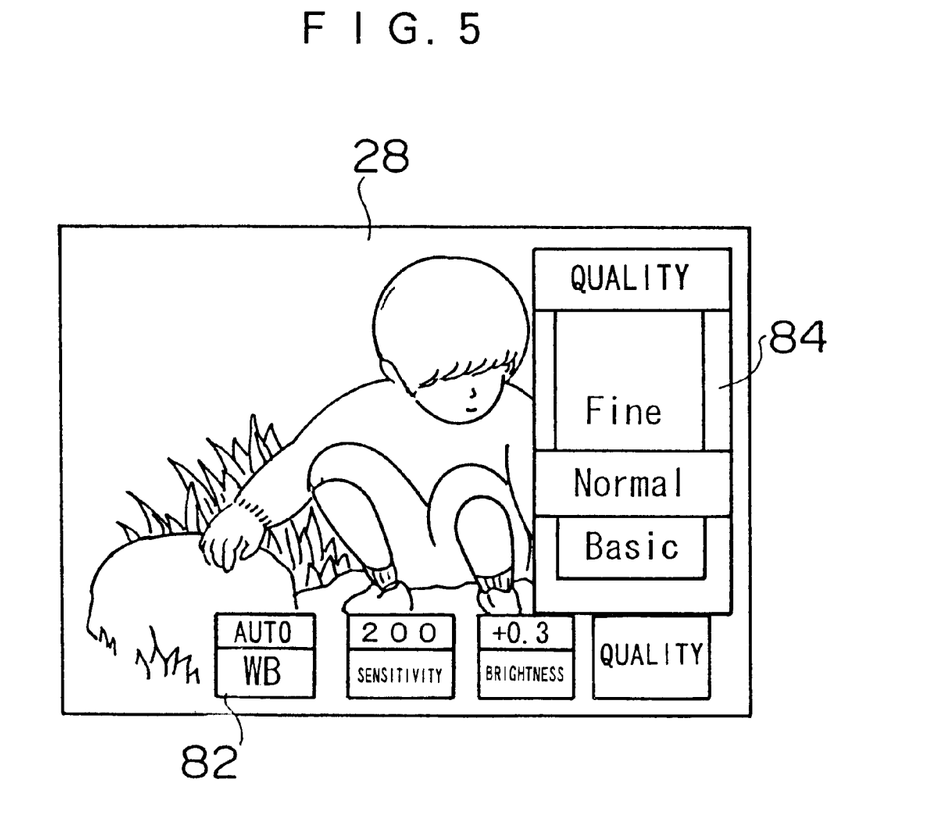
FIG. 5 is an example of a menu display order.

FIG. 5 shows an example of the menu screen. When the menu/execution button 46 is pressed on the manual capturing screen, the capturing setting menu screen as shown in FIG. 5 appears. There are a plurality of items for the capturing setting menu as follows; white balance, ISO sensitivity, brightness (exposure correction), image quality, electric flash, manual focusing, light measuring pattern, sharpness, preview display, self-timer, consecutive capturing, etc. The menu items 82 are displayed in the lower portion of the LCD monitor 28. When the screen is too small to display all of the menu items 82, the menu screen can be divided into pages. In this embodiment, one screen can display four menu items 82 and the left or right key of the cross button 32 is pressed to switch among four menu items.

When the user selects a menu item 82, the sub-menu balloon (sub-menu frame) 84 is popped up. Some candidates for concrete setting items are displayed in the menu balloon 84. The user is requested to press the upper or lower key of the cross button 32 so as to select one of the items, then press the menu/execution button 46 so as to decide the set item.

For example, the user can select auto (auto adjustment), clear sky outdoors, in the shade, daylight fluorescent lamp, filament lamp, etc. for the "white balance" menu item in accordance with the ambient conditions including the lighting at the capturing time. For the "ISO sensitivity" menu item, the user can select any of 200, 400, and 800 sensitivity values. For the "brightness" menu item, the user can set a brightness in steps of about 0.3 EV within a range of −1.5 to +1.5 EV. For the "image quality" menu item, the user can select a compression rate from among the three types of "Fine" (high quality level), "Normal" (normal level), and "Basic" that increases the number of exposures.

For the "electric flash" menu item, the user can set a brightness of the electric flash in steps of 0.3 EV within a range of −0.6 to +0.6 EV. For the "manual focusing" menu item, the user can select either manual focusing ON or OFF. For the "light measurement" menu item, the user can select one of the light measuring patterns of average light measurement for measuring a whole screen so as to take an average of the light levels all over the screen, spot light measurement for measuring the light only in the center of the screen, and multiple-light measurement for measuring the light in each of a plurality of areas divided on the screen. For the "sharpness" menu item, the user can set a proper range for the sharpness level of frame high-lighting in the negative (soft) direction or in the positive (hard) direction from the reference "0". For the "preview display" menu item, the user can select either preview ON or OFF so as to decide whether to display a preview. The current set item is displayed above each menu item.

Figure 6:
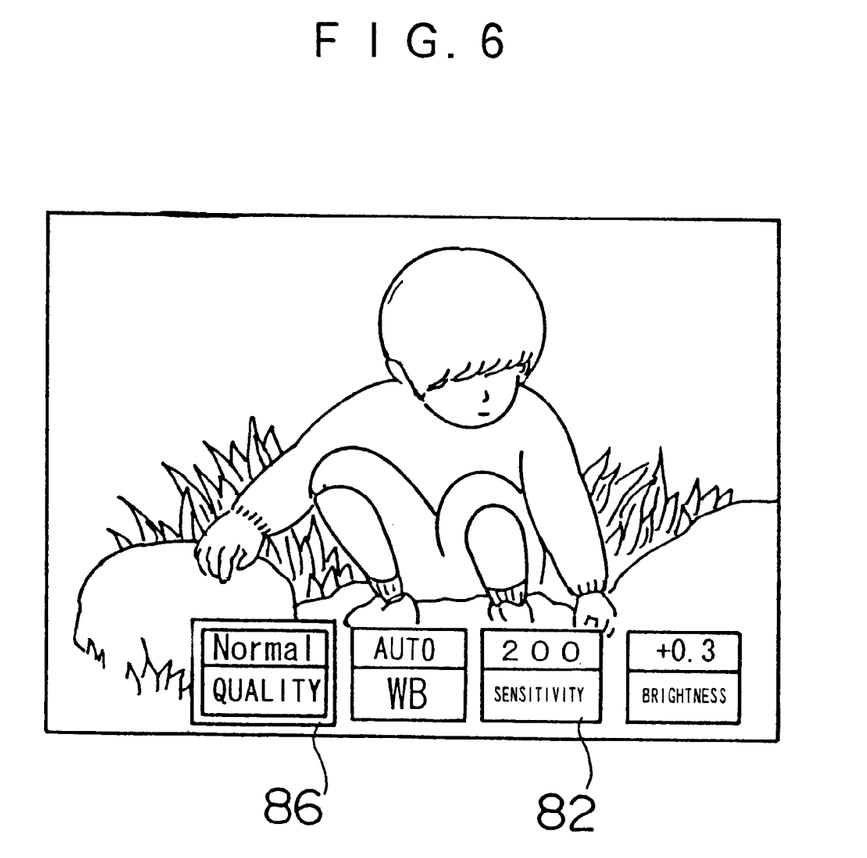
FIG. 6 shows how a display order of menu items is changed.

While the four items "white balance", "ISO sensitivity", "brightness", and "quality" are shown in FIG. 5, the display order of the menu items 82 is changed automatically or specified by the user. For example, it is possible to automatically dispose and display the menu items from left to right in descending frequency order according to the result of frequency counting for each set item change. When the user changes "quality" frequently, the display order of the menu items on the screen is updated so that "quality" comes to the first (left end) position. Thus, the frame-like selection mark (hereinafter, to be referred as the cursor) 86 is positioned at the "quality" item and the position is assumed as the starting position of the cursor 86 on the menu screen to be displayed next time.

Figure 7:
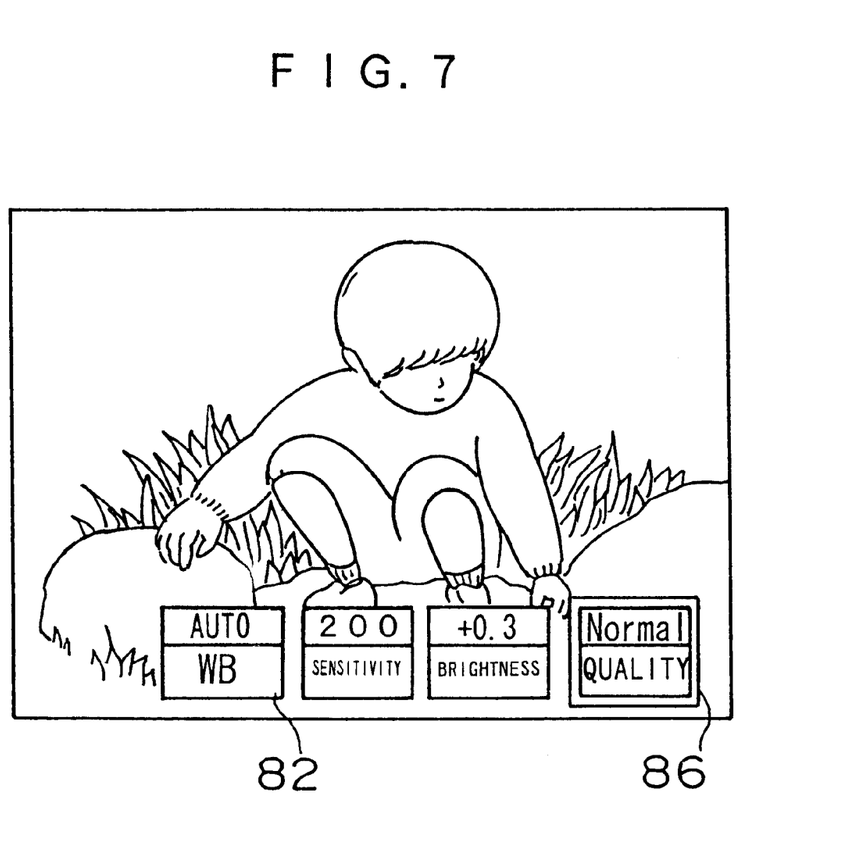
FIG. 7 shows how a starting position of a cursor is changed.

It is also possible to set the item used most frequently as the starting position of the cursor 86 on the initial screen on the menu screen as shown in FIG. 7 while the display order of the menu items 82 is kept unchanged.

Next, a description will be made for the operation of the digital camera 10 composed as described above.

Figure 8:
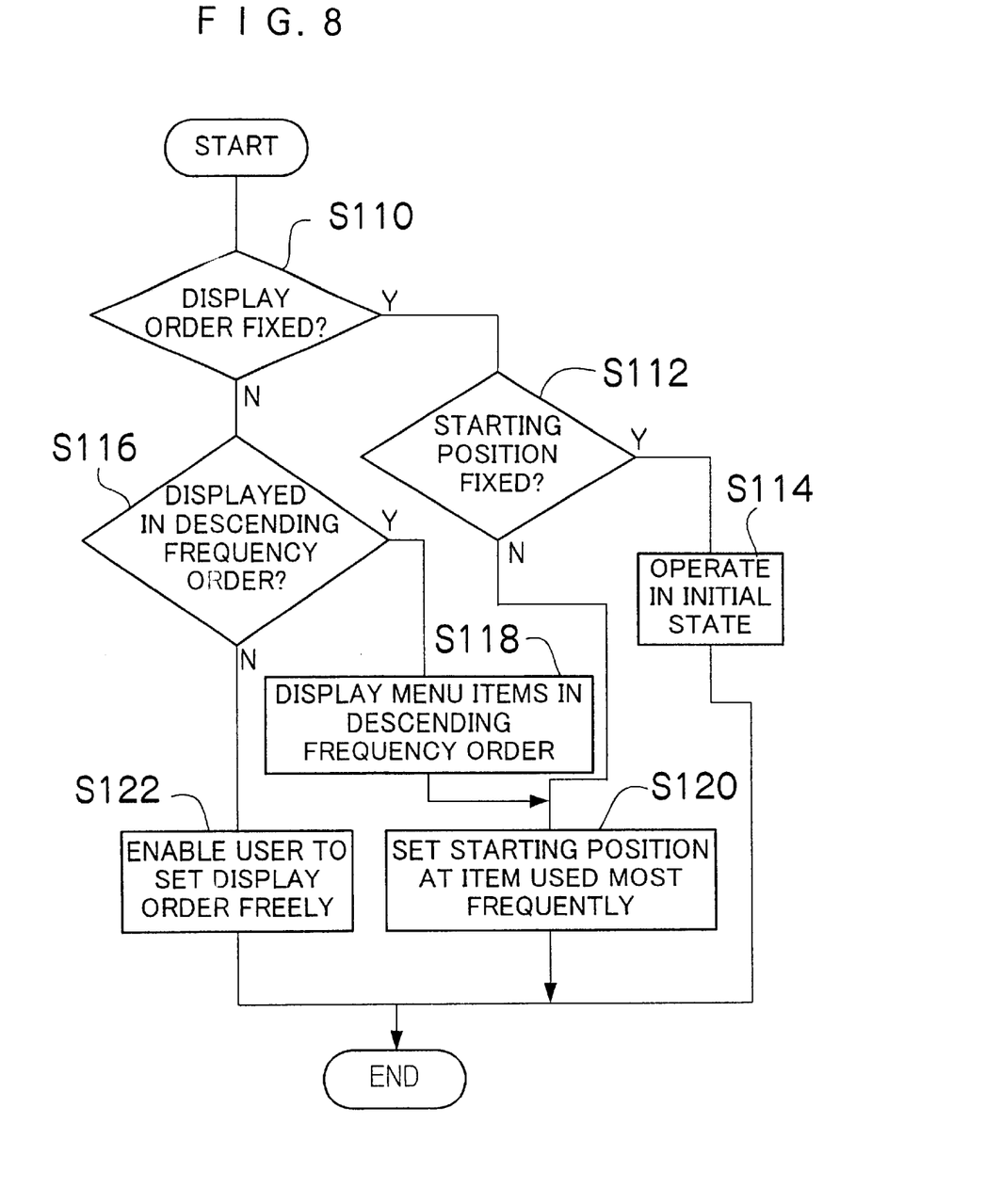
FIG. 8 is a flowchart for controlling a change of a menu display order.

FIG. 8 shows a flowchart for controlling menu display orders. The menu items are displayed differently among three modes; the fixed mode, the automatic updating mode, and the user specified mode. In the fixed mode, the display order of the menu items is fixed in the initial state (at the shipping time). In the automatic updating mode, the display order of the menu items is updated automatically according to how often each menu is used. In the user specified mode, the menu items are displayed in the order specified by the user. The user can select any of the above menu display modes on such a predetermined screen as the "setup" one.

As shown in FIG. 8, when menu display controlling starts, the CPU 64 decides whether or not the fixed mode is selected (step S110). When the decision result is YES (selected), control goes to step S112. Then, the CPU 64 decides whether or not the starting position of the cursor 86 is fixed. When the decision result is YES (set), the CPU 64 uses the menu display order fixed in the initial state (at the shipping time) as is (step S114). In this case, the menu display order and the starting position of the cursor are always the same on the menu screen. It is assumed here that the information in the initial state is stored in a non-volatile memory (ex., EEPROM) (not shown) in the camera 10.

When the cursor starting position is set so as to be changed in step S112 (decision result=NO), the starting position is set at the menu that has been used most frequently. The initial position of the cursor 86 is thus changed to the menu item on the menu screen (step S120). Such a frequency is found, for example, by counting how many times each set item of each menu has been changed for one of N pictures (ex., 5 pictures). When the user changes a plurality of menu items at a time, the frequency of each menu item is counted such way.

When the fixed mode is not selected (decision result=NO) in step S110, control goes to step S116. In step S116, the CPU 64 decides whether to display the menu items in descending frequency order. When the automatic updating mode is selected (decision result =YES), the CPU 64 displays the menu items 82 in descending frequency order (step S118) and sets the starting position of the cursor 86 at the first menu item 82 on the initial menu screen (step S120).

When the menu items are not displayed in descending frequency order (decision result=NO) in step A116, the menu items 82 are displayed in the order specified by the user (step S122). When the processing in step S122, S120, or S114 is ended, this processing routine is exited.

Figure 9:
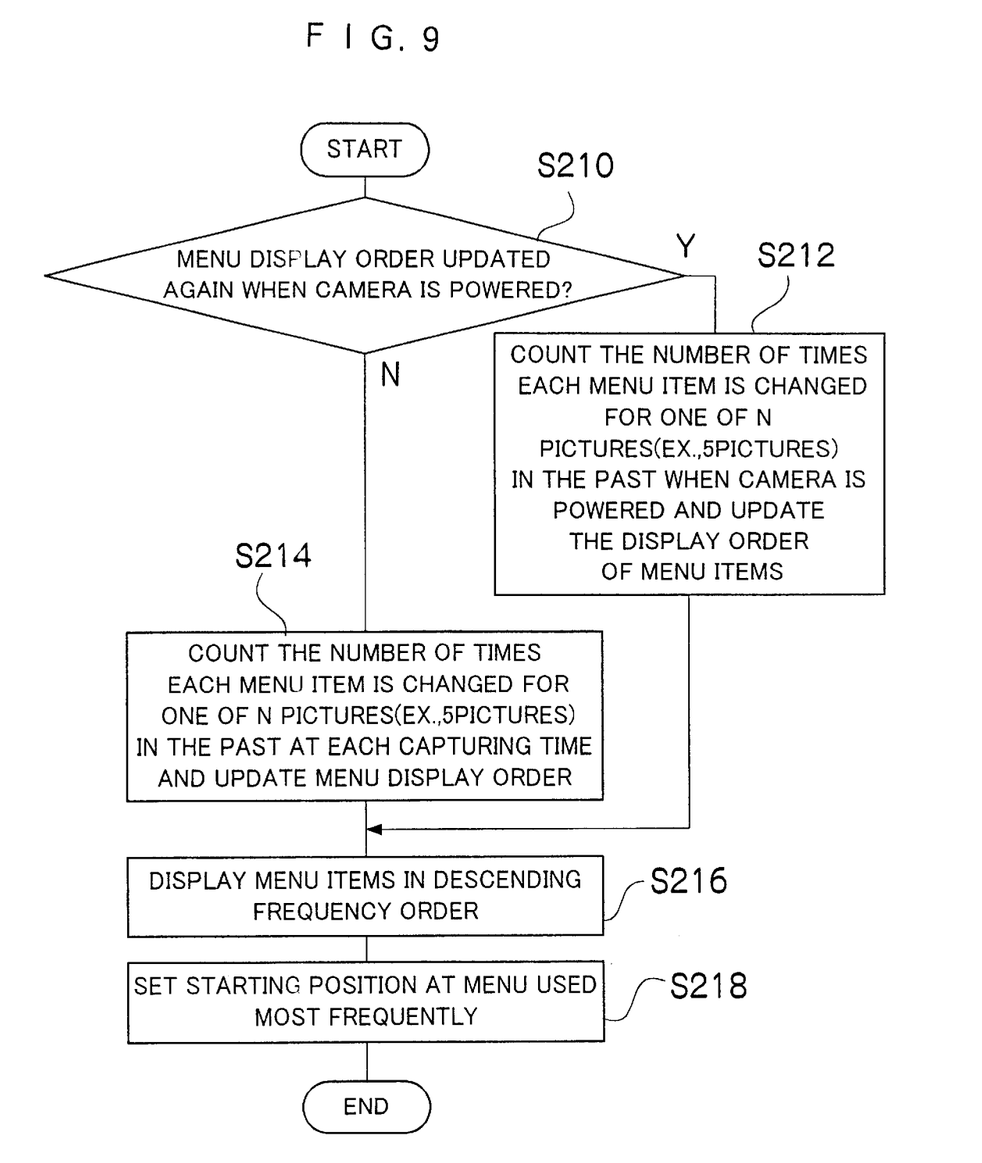
FIG. 9 is a flowchart for controlling updating timings of a display order of menu items.

FIG. 9 shows a flowchart for controlling menu display order updating timings. The display order of the menu items 82 is updated in two modes (timings); in one mode, the display order of the menu items 82 is updated only when the camera 10 is powered while the display order of the menu items 82 is updated at each capturing time in the other mode. The user can select one of the updating modes on such a predetermined screen as the "setup" screen.

When updating timing controlling starts, the CPU 64 checks the menu display order updating timing; the CPU 64 decides whether or not the mode for updating the menu display order when the camera 10 is powered is selected (step S210). When the decision result is YES, control goes to step S212. In step S212, the CPU 64 counts how many times each set item of each menu has been changed for one of N pictures (ex., 5 pictures) each time the camera 10 is powered. Then, the CPU 64 updates the menu display order so as to be disposed in descending frequency order according to the counting result.

On the other hand, when the decision result in step S210 is NO, control goes to step S214. In step S214, the CPU 64 counts the frequency just like above at each capturing time. Then, the CPU 64 updates the menu display order to descending frequency order at each capturing time according to the counting result. After the processing in step S214 or S212, the menu items 82 are displayed in descending frequency order (step S216) so that the menu used most frequently is decided as the starting position of the cursor (step S218). This processing routine is then exited.

The menu item display order method is not limited only to the above one in which the use frequency of each menu item 82 is recounted after each capturing, thereby updating the menu display order; the use frequency may be counted after each capturing by predetermined times so as to update the menu display order.

Figure 10:
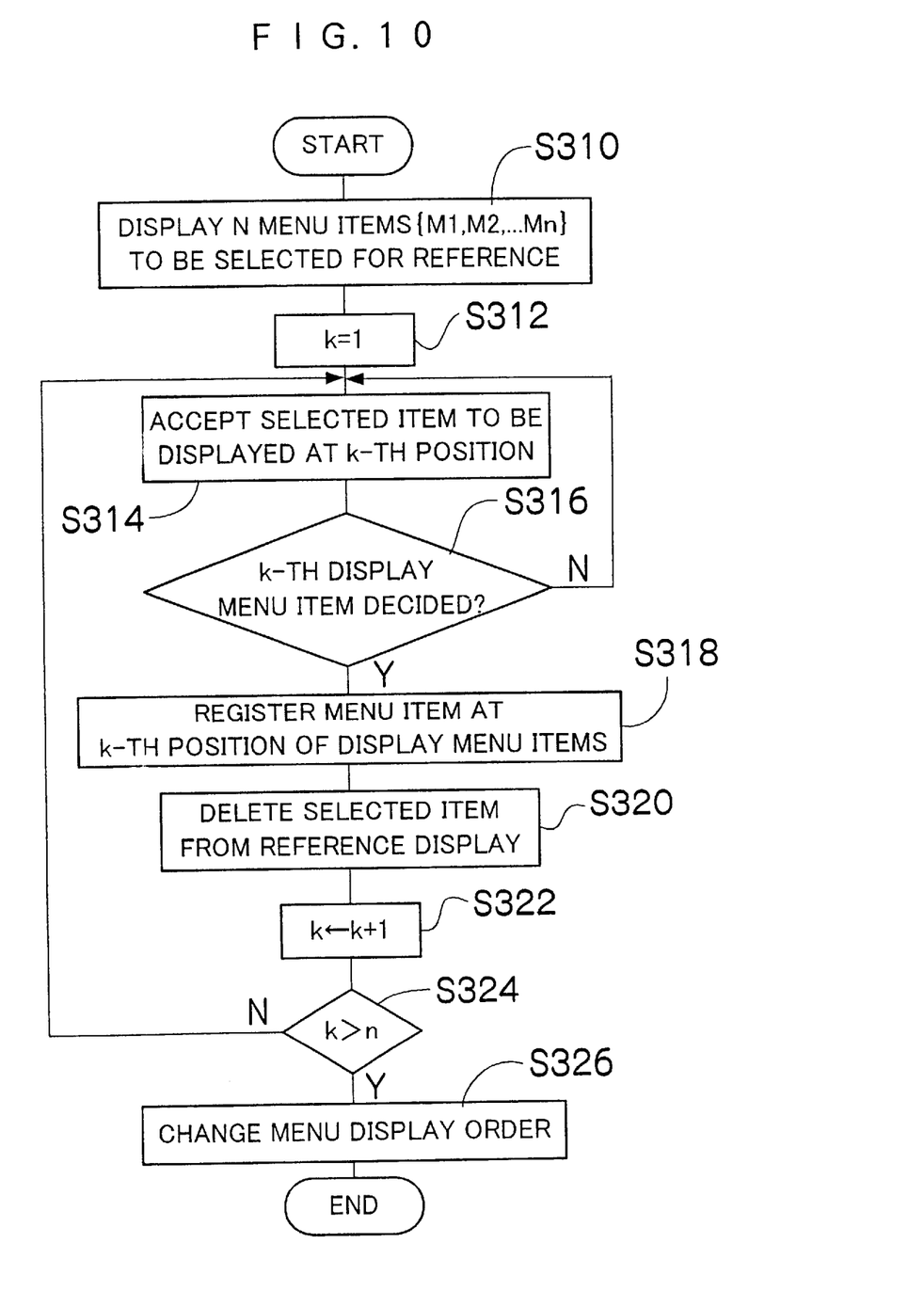
FIG. 10 is a flowchart of a processing procedure for enabling a user to decide a display order of menu items freely.

FIG. 10 shows a flowchart for setting a menu display order specified by the user. In this case, it is assumed that there are n menu items (M1, M2, . . . , Mn). At first, n menu items (M1, M2, . . . , Mn) that are expected to be selected are displayed on the screen of the LCD monitor 28 (step S310). At this time, the camera 10 should preferably be provided with a function for displaying the updated frequency order of the menu item 82 and the change count of each menu item together. The user can thus examine the display order of the menu items 82 with reference to the frequency order and the change frequency count.

Then, the CPU 64 sets the initial value "k=1" for the count value k of the counter (step S312) and accepts the selection of a menu item to be displayed at the k-th position on the menu screen (step S314). The CPU 64 then decides whether or not the user specifies a menu item to display (step S316). When the decision result is NO, control goes back to step S314 so as to wait for the specification of the user.

When the user specifies a menu item to be displayed at the k-th position, the decision result in step S316 becomes YES. Control thus goes to step S318. In step S318, the CPU 64 registers the user-specified menu item to be displayed at the k-th position. When the menu item to be displayed at the k-th position is registered such way, the registered menu item is deleted from the reference display screen (step S320). Consequently, the n-k menu items are displayed for reference as candidate menu items.

After this, the counter value k is increased by one (step S322), then the CPU 64 decides whether or not the counter value k exceeds the total count n of the menu items (step S324). When the decision result in step S324 is NO, control goes back to step S314. The CPU 64 then registers the display order of each subsequent menu item sequentially in the same way.

When the display orders of all the menu items are registered, the decision result in step S324 becomes YES and control goes to step S326. In step S326, the CPU 64 displays the menu items in the registered display order. The menu items are thus displayed in the order specified by the user.

Next, a variation of the above embodiment of the present invention will be described.

As cameras are getting smaller and smaller in size, a plurality of functions have come to be assigned to one operation button. Usually, around such an operation button are silk-printed characters and symbols for denoting the functions of the operation button. And, such the operation button, when it is sophisticated more in function, comes to be varied widely in function, thereby it becomes difficult to print those functions for marking.

Figure 11:
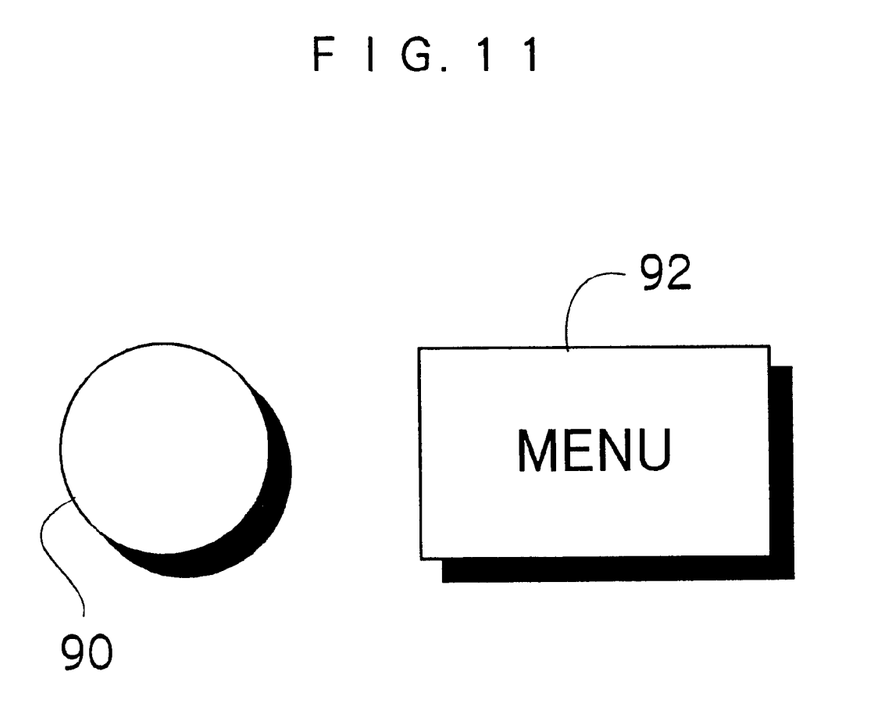
FIG. 11 is an example of means for enabling the user to decide the function of a multi-functional button freely.

This is why an LCD block 92 is provided around the operation button 90 as shown in FIG. 11 so that the functions of the operation button 90 are displayed on the block 92. When the power of the camera 10 is off, nothing is displayed on the display block 92. When the camera 10 is powered, the functional information of the button 90 is displayed on the display block 92.

The user can set functions for the operation button 90 and items to be displayed on the LCD block 92 as needed. Because it is possible to store the history of the changes of set items in the non-volatile memory (ex., EEPROM) (not shown) built in the camera 10, it is easy to restore any set item to the one set in the past.

Furthermore, it would be convenient to link the operation button 90 and the LCD block 92 shown in FIG. 11 to capturing menu items so as to assign them to a jump button (one-push command button) used to jump to any of the menu items to be used frequently. In this case, the operation button 90, as well as the updating of the menu items in descending frequency order described with reference to FIGS. 8 and 9 are assigned to a jump button used to jump to the menu item used most frequently, so that characters or symbols for denoting the menu items are displayed on the LCD block 92.

While a digital camera has been described in the above embodiments, the present invention is not limited only to the item; the present invention can also apply widely to such electronic cameras as video cameras, each of which captures subject images by converting images to electric signals with use of a capturing element.

As described above, the electronic camera of the present invention enables the user to set a display order of menu items freely on the menu screen and the display order of the menu items can be changed automatically according to the use frequency, thereby it is possible to make it easier for the user to use the camera. Furthermore, the camera is configured so as to set automatically the starting position of the cursor to an item used most frequently while the display order of the menu items is kept as is. The operability of the camera is thus improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera comprising:
   a capturing device which converts a subject optical image to an electric signal;
   a recording device which records the image captured by the capturing device on a recording medium;
   a displaying device which displays a plurality of menu items for setting a capturing condition;
   a display order deciding device which decides an order for displaying the menu items;
   a menu display changing device which disposes menu items in accordance with the order decided by the display order deciding device so as to change the display order of the menu items;
   an operating device through which a command is entered for selecting a desired menu item among a plurality of the menu items;
   a display order setting device which enables the user to set a display order of the menu items freely;
   a frequency counting device which counts a frequency of changes of each menu item set content;
   a display mode selecting device which selects a free mode for enabling the user to set a display order of menu items freely and a frequency order mode for changing a display order of menu items in descending frequency order automatically,
   wherein the display order deciding device decides the order for displaying the menu items in accordance with a previously set content of the display order setting device when the free mode is selected,
   wherein the display order deciding device decides the order for displaying the menu items in accordance with descending frequency order found by the frequency counting device when the frequency order mode is selected.

2. The electronic camera as defined in claim 1, further comprising:
   a fixed display order storing device which stores a predetermined display order; and
   a fixed display directing device through which a command is entered for switching the menu display in accordance with the predetermined display order,
   wherein a menu display order is switched to the predetermined display order stored in the fixed display order storing device when the command is entered through the fixed display directing device.

3. The electronic camera as defined in claim 1, wherein an action for executing menu updating of said order for displaying the menu items in accordance with descending frequency order is initiated by a user in at least one of two modes.

4. The electronic camera as defined in claim 3, wherein the action for executing menu updating is initiated when the camera is powered on in a first mode.

5. The electronic camera as defined in claim 3, wherein the action for executing menu updating is initiated when an image is captured by the user in a second mode.

6. The electronic camera as defined in claim 4, wherein the action for executing menu updating is initiated when an image is captured by the user in a second mode.

7. The electronic camera as defined in claim 1, wherein the frequency order of an updated menu and a number of updates of each menu are displayed together.

8. The electronic camera as defined in claim 7, wherein an assisting function permits the frequency order of an updated menu and a number of updates of each menu to be displayed together.

9. The electronic camera of claim 1, wherein the menu items relate to at least one of functions to be performed prior to and during recording the image by the recording device.

10. An electronic camera, comprising:
    a capturing device which converts a subject optical image to an electric signal;
    a recording device which records the image captured by the capturing device on a recording medium;
    a displaying device which displays a plurality of menu items used to set a capturing condition;
    an operating device through which a command is entered for selecting a desired menu item among a plurality of the menu items by moving a cursor onto the desired menu item;

a frequency counting device which counts a frequency of changes of each menu item set content;

a starting position deciding device which decides a menu item changed most frequently as a starting position of the cursor according to a result of counting by the frequency counting device on a menu screen; and a starting position changing device which changes the starting position of the cursor for a menu display order in accordance with a decision of the starting position deciding device while maintaining the menu display order.

11. The electronic camera of claim 10, wherein the camera further includes:

a display mode selecting device for selecting a display mode from a plurality of modes, wherein the plurality of modes includes a free mode for enabling a user to set a display order of menu items freely and a frequency order mode for displaying the menu items in order of frequency of use, wherein the displaying device displays the menu items in the display mode selected by the display mode selecting device.

12. The electronic camera of claim 11, wherein an action for executing menu updating of the order for displaying the menu items in accordance with the frequency mode is initiated by a user in at least one of two modes.

13. An electronic camera comprising:

a capturing device which converts a subject optical image to an electric signal;

a recording device which records the image captured by the capturing device on a recording medium;

a displaying device which displays a plurality of menu items for setting a capturing condition, wherein the menu items relate to at least one of functions to be performed prior to and during recording the image by the recording device; and a display mode selecting device for selecting a display mode from a plurality of modes, wherein the plurality of modes includes a free mode for enabling a user to set a display order of menu items freely and a frequency order mode for displaying the menu items in order of frequency of use, wherein the display device displays the menu items in the display mode selected by the display mode selecting device.

* * * * *